(12) United States Patent
Vega et al.

(10) Patent No.: US 10,981,537 B2
(45) Date of Patent: Apr. 20, 2021

(54) SEATBELT HEIGHT ADJUSTER

(71) Applicant: Ford Global Technologies, LLC, Dearborn, MI (US)

(72) Inventors: Daniel Vincent Vega, Belleville, MI (US); Daniel Robert Taylor, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 16/434,986

(22) Filed: Jun. 7, 2019

(65) Prior Publication Data
US 2020/0384944 A1   Dec. 10, 2020

(51) Int. Cl.
*B60R 22/20* (2006.01)
*B60R 22/24* (2006.01)

(52) U.S. Cl.
CPC .......... *B60R 22/203* (2013.01); *B60R 22/24* (2013.01)

(58) Field of Classification Search
CPC ... B60R 22/203; B60R 22/206; B60R 22/202; B60R 22/20
See application file for complete search history.

(56) References Cited

U.S. PATENT DOCUMENTS

| | | | |
|---|---|---|---|
| 4,826,210 A | 5/1989 | Schmidt | |
| 4,989,900 A * | 2/1991 | Steinhuser | B60R 22/203 280/801.2 |
| 5,044,666 A | 9/1991 | Griesmer | |
| 5,280,959 A | 1/1994 | Nanbu | |
| 5,924,731 A * | 7/1999 | Sayles | B60R 22/203 280/801.2 |
| 6,733,041 B2 | 5/2004 | Arnold et al. | |
| 2007/0169979 A1* | 7/2007 | Mohammad | B60R 22/202 180/268 |
| 2014/0042282 A1* | 2/2014 | Neero | B60R 22/203 248/297.31 |
| 2016/0068134 A1* | 3/2016 | Bok | B60R 22/202 280/801.2 |

FOREIGN PATENT DOCUMENTS

| | | | | |
|---|---|---|---|---|
| DE | 10202623 A1 * | 8/2003 | ............ | B60R 22/24 |
| DE | 102011111781 A1 * | 3/2013 | ........... | B60R 22/203 |
| EP | 2060449 B1 | 5/2010 | | |

* cited by examiner

*Primary Examiner* — Paul N Dickson
*Assistant Examiner* — Mary E Young
(74) *Attorney, Agent, or Firm* — Frank A. MacKenzie; Bejin Bieneman PLC

(57) ABSTRACT

A seatbelt height adjuster includes a track, a slider slidably coupled to the track, slots in one of the track and the slider and teeth on the other of the track and the slider. The teeth are selectively engageable with the slots. The seatbelt height adjuster includes a D-ring supported by the slider and leaf springs disposed on opposite sides of the slider. The leaf springs are each engaged with the track and biasing the slider in opposite directions.

20 Claims, 6 Drawing Sheets

SEATBELT HEIGHT ADJUSTER

BACKGROUND

Vehicles include seatbelts for each of the seats. The seatbelt includes webbing that, when the seatbelt is buckled, extends across an occupant of the seat. An anchor attaches one end of the webbing to a vehicle body. The other end of the webbing feeds into a retractor, which includes a spool that pays out and retracts the webbing. A clip slides freely along the webbing and, when engaged with a buckle, divides the webbing into a lap band and a shoulder band. A D-ring is mounted to the pillar of the vehicle and supports the seat belt at shoulder level of the occupant. The D-ring may be vertically adjustable along the pillar to accommodate varying shoulder heights of different occupants. For example, the D-ring may be manually adjustable.

DETAILED DESCRIPTION

Figure 1A:
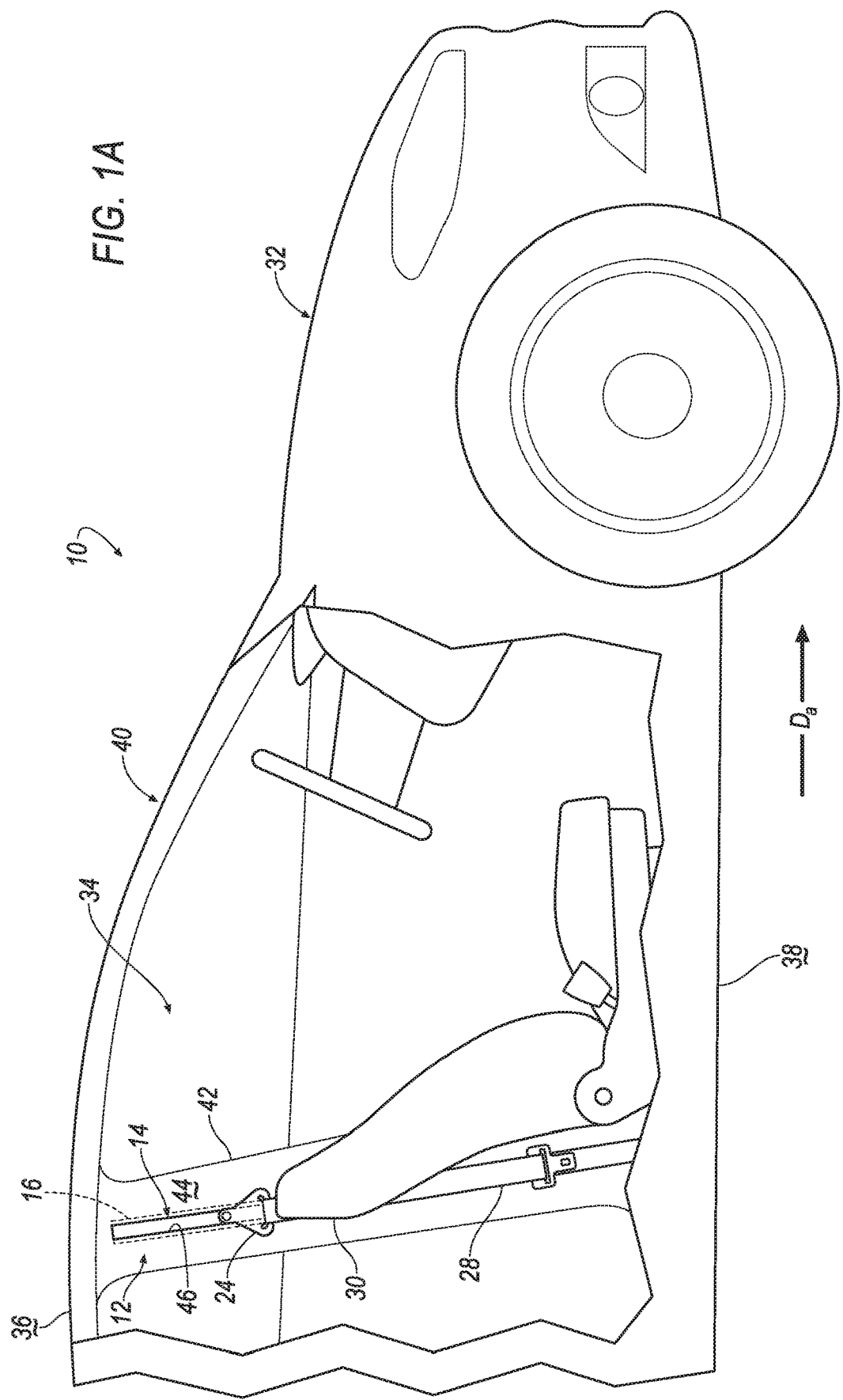
FIG. 1A is a side view of a vehicle including a seatbelt height adjuster having a slider in a first position.

A seatbelt height adjuster includes a track, a slider slidably coupled to the track, and slots in one of the track and the slider and teeth on the other of the track and the slider. The teeth are selectively engageable by the slider. A D-ring is supported by the track. Leaf springs are disposed on opposite sides of the slider. The leaf springs each engaged with the track and biasing the slider in opposite directions The track may be elongated along an axis, and the slider may be slidable along the axis when the teeth are disengaged with the slots.

The slider may be slidable transverse to the axis to engage the teeth with the slots.

The slider may compress one of the leaf springs when the slider slides transverse to the axis.

The teeth may be spaced from each other along the axis.

The slots may be spaced from each other along the axis.

The leaf springs may be elongated along the axis.

The track may be elongated along an axis, and the leaf springs may bias the slider toward a position centered on the axis.

The slider may be slidable transverse to the axis to engage the teeth with the slots.

The slider may compress one of the leaf springs when the slider slides transverse to the axis.

The teeth may be spaced from each other along the axis.

The slots may be spaced from each other along the axis.

The leaf springs may be elongated along the axis.

The teeth may be extendable through respective slots.

The teeth may be elongated transverse to the leaf springs.

One of the leaf springs and the teeth may be disposed between the D-ring and the other of the leaf springs and the teeth.

The seatbelt height adjuster may include a stopper fixed to the track. The slider may be engageable with the stopper.

The D-ring may be pivotable relative to the slider.

The seatbelt height adjuster may include a webbing extending through the D-ring. The leaf springs may be designed to slide along the track when a force above a predetermined force is applied to the webbing when the teeth are disengaged with the slots.

A vehicle includes a pillar, a track elongated along the pillar, a slider slidably coupled to the track, and slots in one of the track and the slider and teeth on the other of the track and the slider. The teeth are selectively engageable by the slider. A D-ring is supported by the track. Leaf springs are disposed on opposite sides of the slider. The leaf springs each engaged with the track and biasing the slider in opposite directions With reference to the Figures, wherein like numerals indicate like parts throughout the several views, a vehicle 10 is generally shown. The vehicle 10 includes a seatbelt assembly 12 having a seatbelt height adjuster 14 including a track 16, a slider 18 slidably coupled to the track 16, slots 20 in one of the track 16 and the slider 18, and teeth 22 on the other of the track 16 and the slider 18. The teeth 22 are selectively engageable with the slots 20. The seatbelt height adjuster 14 includes a D-ring 24 supported by the slider 18, and leaf springs 26 disposed on opposite sides 66 of the slider 18. The leaf springs 26 are each engaged with the track 16 and bias the slider 18 in opposite directions.

Figure 1B:
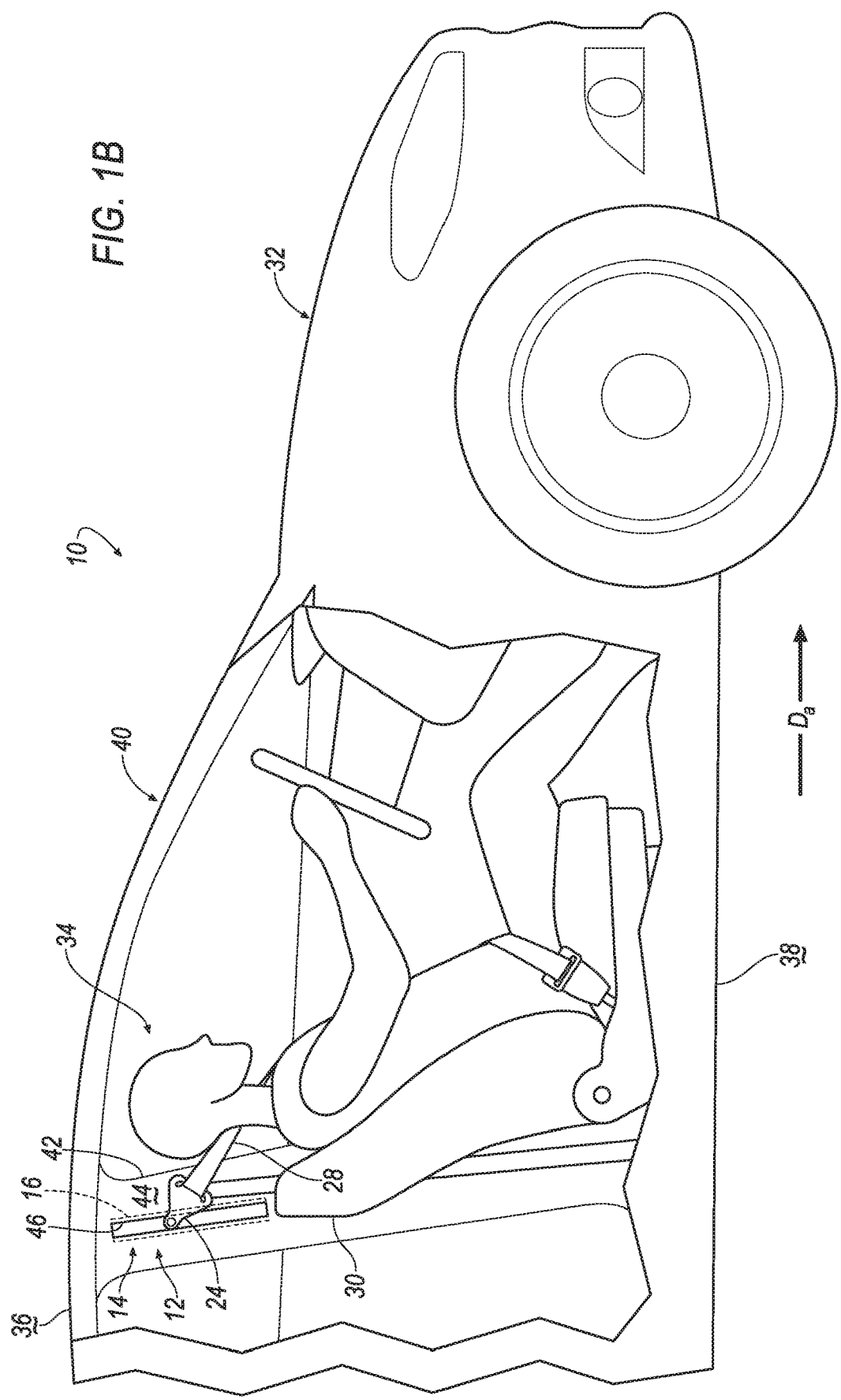
FIG. 1B is a side view of the vehicle including the seatbelt height adjuster in a second position.
Figure 3A:
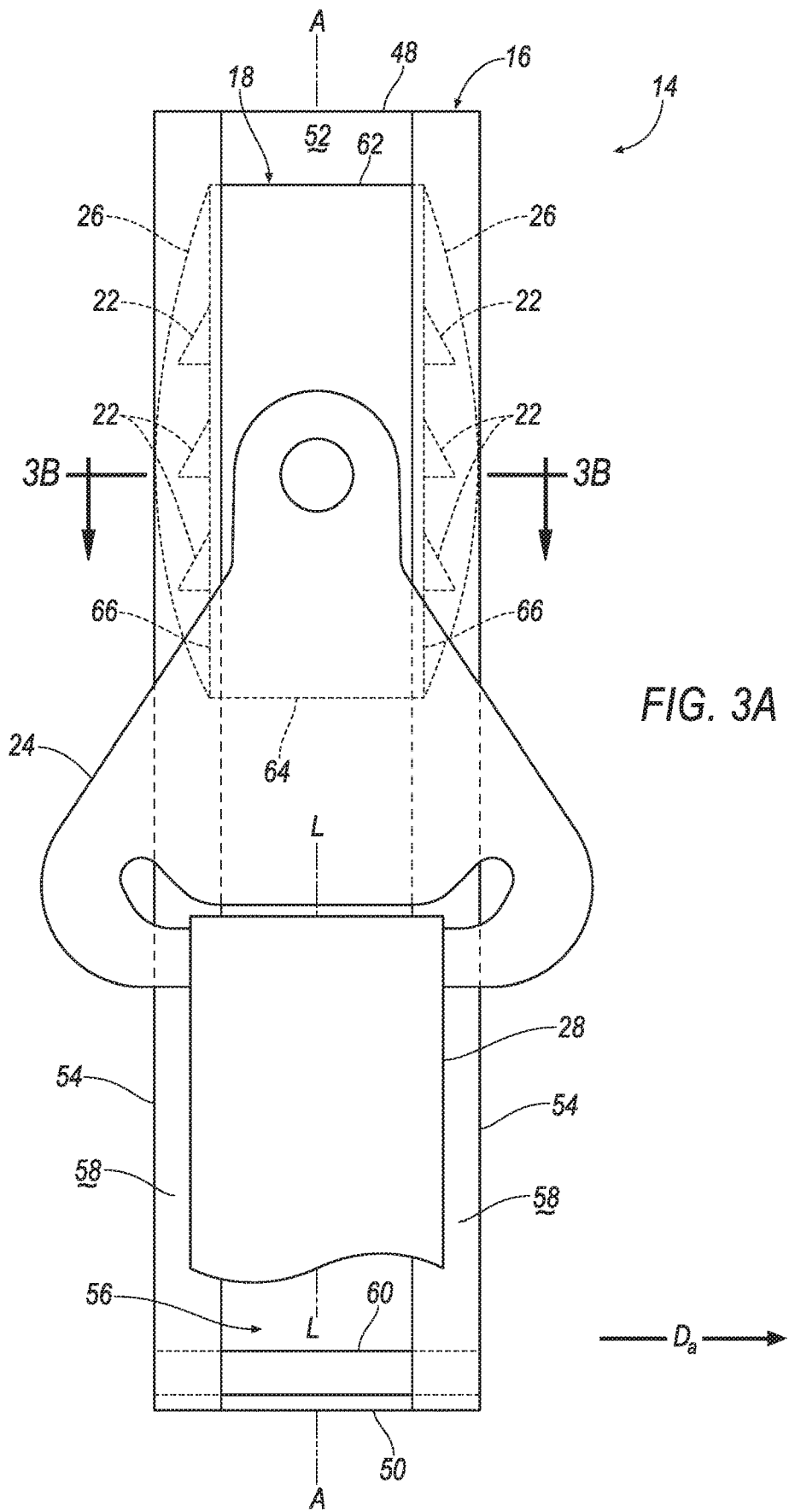
FIG. 3A is a front view of the seatbelt height adjuster having the slider in an unlocked state.
Figure 3B:
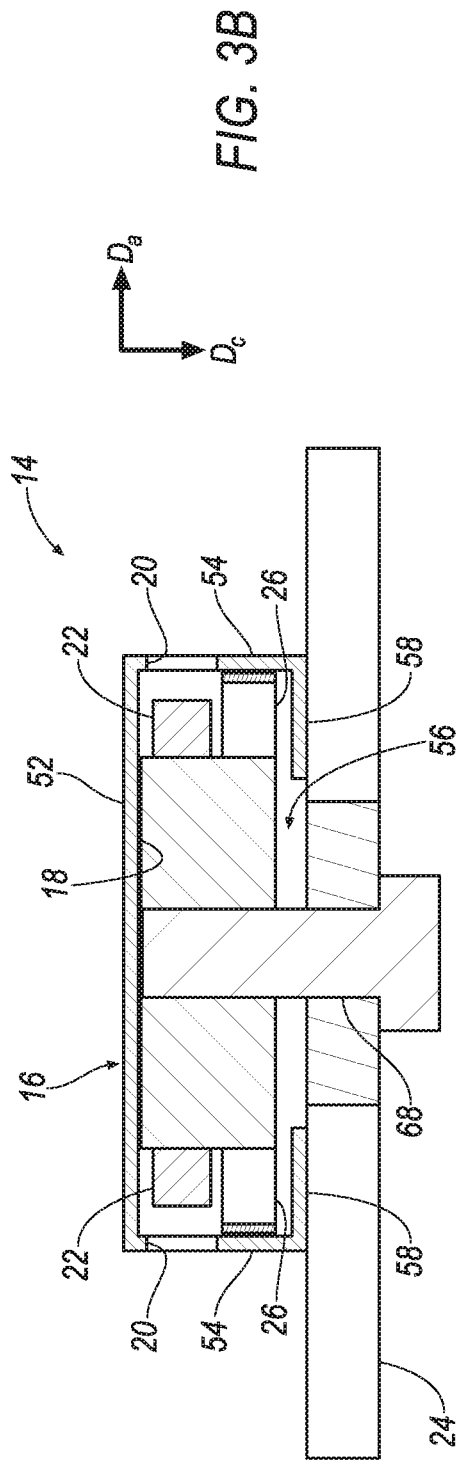
FIG. 3B is a cross-sectional view along line 3B of the seatbelt height adjuster shown in FIG. 3A.
Figure 4B:
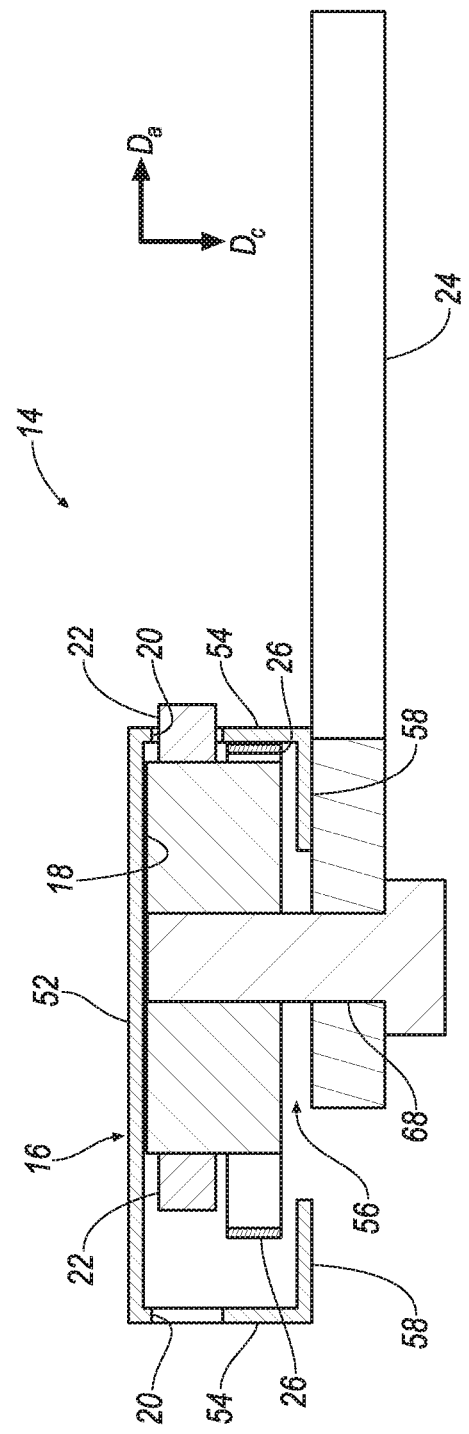
FIG. 4B is a cross-sectional view along line 4B of the seatbelt height adjuster shown in FIG. 4A.
Figure 4A:
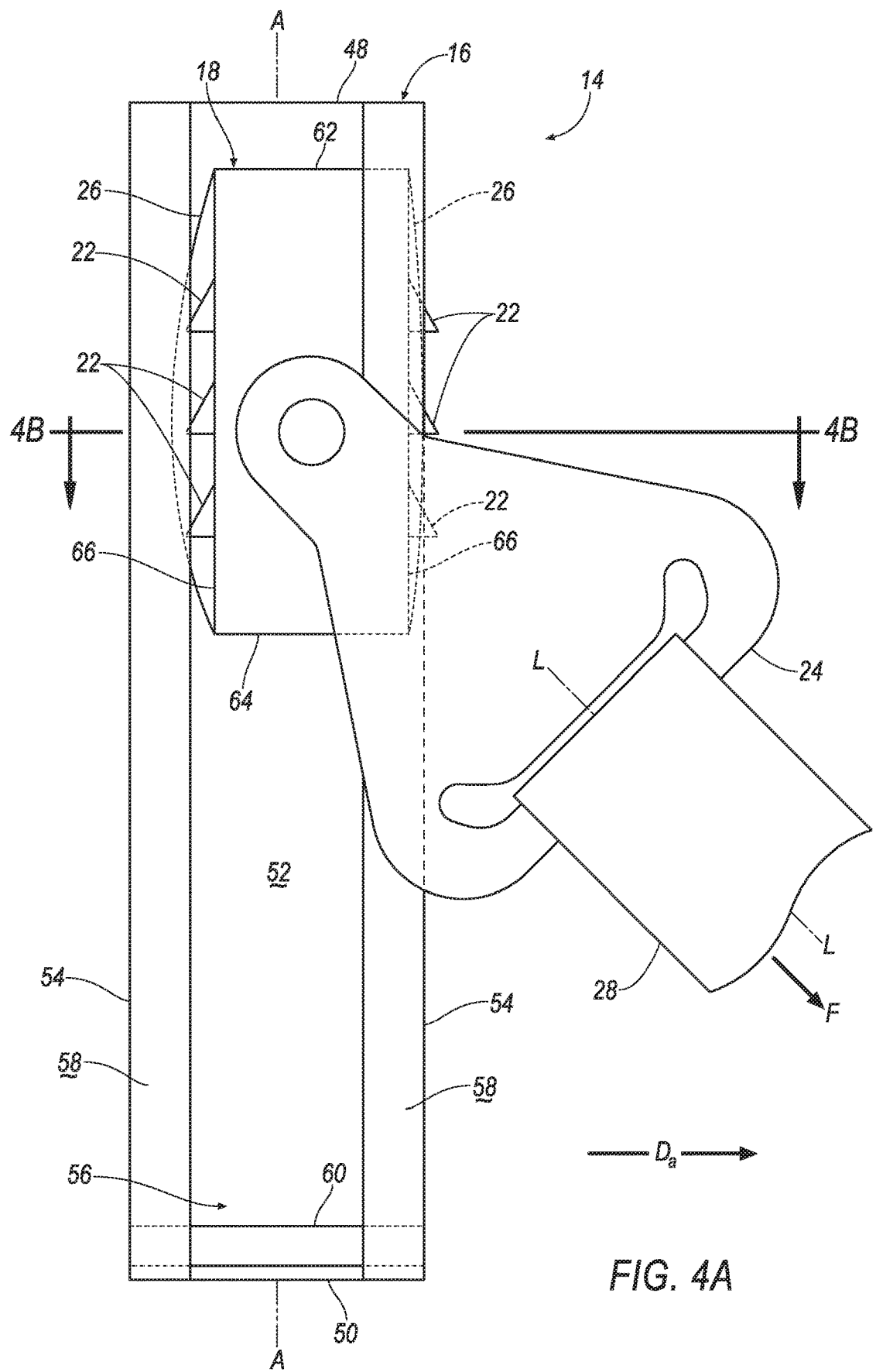
FIG. 4A is a front view of the seatbelt height adjuster having the slider in a locked state.

The seatbelt assembly 12 may include a webbing 28 engageable with a seat 30, as discussed below. During normal operation, the slider 18 is in an unlocked state, as shown in FIGS. 3A and 3B. In this situation, the slider 18 may be moveable by the webbing 28 along the track 16 from a first position, as shown in FIG. 1A, to a second position, as shown in FIG. 1B. The webbing 28 may move the slider 18 along the track 16 when an occupant pulls the webbing 28, e.g., over a shoulder, to engage the webbing 28 with the seat 30. In this situation, the slider 18 moves the D-ring 24 along the track 16 based on a size, e.g., height, of the occupant. The leaf springs 26 retain the slider 18 in the second position when the webbing 28 is engaged with the seat 30, i.e., extended over the shoulder of the occupant. During a vehicle impact, the momentum of the occupant may bias the occupant relative to the seat 30. For example, in a front impact or an oblique impact, the momentum of the occupant may bias the occupant away from the seat 30. When the occupant moves away from the seat 30, the occupant may be urged into the webbing 28. In this situation, the webbing 28 pulls the slider 18 forward relative to the track 16 such that the slider 18 overcomes the bias of one leaf spring 26 and engages in a locked state, as shown in FIGS. 4A and 4B. In the locked state, the teeth 22 engage with the slots 20, which fixes the slider 18 relative to the track 16. By fixing the slider 18 relative to the track 16 during the vehicle impact, the seatbelt height adjuster 14 may distribute loads from the occupant to the vehicle 10 such that the seatbelt assembly 12 may control kinematics of the occupant.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in a vehicle fore-and-aft direction Da. Each side of the vehicle 10 may be similar or identical to each other.

With reference to FIGS. 1A and 1B, the vehicle 10 includes a body 32 defining a passenger cabin 34. The passenger cabin 34 houses occupants, if any, of the vehicle 10. The passenger cabin 34 includes a front end (not numbered) and a rear end (not numbered) with the front end being in front of the rear end during forward movement of the vehicle 10. The passenger cabin 34 includes one or more seats 30. The seats 30 may be arranged in any suitable arrangement. For example, one or more of the seats 30 may be at the front end of the passenger cabin 34, i.e., a front seat, and/or one or more of the seats 30 may be at the rear end of the passenger cabin 34, i.e., a rear seat.

With continued reference to FIGS. 1A and 1B, the body 32 may include a roof 36, a floor 38 spaced from the roof 36, and a plurality of pillars 40, 42 extending downwardly from the roof 36, i.e., generally towards the floor 38. The roof 36 and the floor 38 may each extend across the passenger cabin 34, i.e., from one side to the other side of the vehicle 10 and from the front end to the rear end of the passenger cabin 34. The roof 36 may define an upper boundary of the passenger cabin 34 and the floor 38 may define a lower boundary of the passenger cabin 34.

With continued reference to FIGS. 1A and 1B, the pillars 40, 42 may include an A-pillar 40 disposed adjacent the front end of the passenger cabin 34, and a B-pillar 42 spaced from the A-pillar 40 in the vehicle fore-and-aft direction Da. The front seats 30 may, for example, be disposed between the A-pillar 40 and the B-pillar 42. The pillars 40, 42 may include additional pillars, e.g., a C-pillar (not shown). Each side of the vehicle 10 may include the plurality of pillars 40, 42. In other words, the vehicle 10 may include two A-pillars 40 and two B-pillars 42, e.g., one A-pillar 40 and one B-pillar 42 is disposed on each side of the vehicle 10.

With continued reference to FIGS. 1A and 1B, a pillar trim 44 may be attached to the B-pillar 42. The pillar trim 44 may extend at least partially along the B-pillar 42. For example, the pillar trim 44 may be monolithic, e.g., a single piece extending from the roof 36 to the floor 38. As another example, the pillar trim 44 may include a plurality of components that are separately formed and subsequently attached together. The pillar trim 44 may be attached to the B-pillar 42 by in any suitable manner, e.g., clips, fasteners, etc. The pillar trim 44 may be any suitable material, e.g., plastic, vinyl, etc.

With continued reference to FIGS. 1A and 1B, the pillar trim 44 may, for example, include a slot 46 elongated along the B-pillar 42. The slot 46 may extend through the pillar trim 44 transverse to the vehicle fore-and-aft direction Da, e.g., in the cross-vehicle direction Dc. The slot 46 may, for example, face towards the front seats 30. The seatbelt height adjuster 14 may be engaged with the slot 46. For example, the seatbelt height adjuster 14 may be disposed in the slot 46 and be slidable relative to the slot 46. Specifically, the D-ring 24 may extend through the slot 46 and be slidable along the slot 46.

Each seat 30 is supported by the floor 38, as shown in FIGS. 1A and 1B. The position and orientation of the seats 30 and components thereof may be adjustable by an occupant. In this situation, each seat 30 may slide relative to the floor 38, e.g., in the vehicle fore-and-aft direction Da, along a seat track (not shown). As another example, each seat 30 may be fixed relative to the floor 38. In this situation, the seats 30 may be immovable relative to the floor 38. Each front seat 30 is disposed adjacent to one respective B-pillar 42.

The vehicle 10 may include any suitable number of seatbelt assemblies. For example, the vehicle 10 may include one seatbelt assembly 12 for each seat 30. In such an example, each seatbelt assembly 12 may be disposed adjacent to one seat 30. Each seatbelt assembly 12, when fastened, retains the occupant on the respective seat 30, e.g., during sudden decelerations of the vehicle 10.

The seatbelt assembly 12 may include a seatbelt retractor (not shown) and the webbing 28 retractably payable from the retractor. Additionally, the seatbelt assembly 12 may include an anchor (not shown) coupled to the webbing 28, and a clip (not numbered) that engages a seatbelt buckle (not numbered).

The retractor may be attached to the body 32. For example, the retractor may be attached to the B-pillar 42. As another example, when the restraint system is adjacent the rear seat, the retractor may be attached to the C-pillar. Alternatively, the retractor may be attached to the front seat 30, e.g., a frame (not shown) of the front seat 30. The retractor may be attached to the body 32 in any suitable manner, e.g., fasteners.

The webbing 28 may include a first end (not shown) and a second end (not numbered). The webbing 28 extends continuously from the first end to the second end. The first end of the webbing 28 is retractably engaged with the retractor, i.e., feeds into the retractor. For example, the webbing 28 may be retractable to a retracted position, as shown in FIG. 1A, and extendable to an extended position, as shown in FIG. 1B, relative to the retractor. In the retracted position, the webbing 28 may be retracted into the retractor, i.e., wound around a spool (not shown). In the extended position, the webbing 28 may be paid out from the retractor, e.g., towards the occupant. In this situation, the webbing 28 may extend across a seatback (not numbered) of the seat 30. The second end of the webbing 28 may be attached to the anchor. The anchor may, for example, be attached to the body 32, e.g., the B-pillar 42, the floor 38, etc. Alternatively, the anchor may be attached to the seat 30, e.g., a seat bottom. The anchor may be attached to the body 32 in any suitable manner, e.g., with fasteners. The webbing 28 may be a woven fabric, e.g., woven nylon.

The clip may be slidably engaged with the webbing 28. The clip may, for example, slide freely along the webbing 28 and selectively engage with the seatbelt buckle. In other words, the webbing 28 may be engageable with the seatbelt buckle. The clip may, for example, be releasably engageable with the seatbelt buckle from a buckled position, as shown in FIG. 1B to an unbuckled position, as shown in FIG. 1A. In the buckled position, the webbing 28 may be fixed relative to the seatbelt buckle. In other words, the seatbelt buckle may prevent the webbing 28 from retracting into the retractor. When the clip is engaged with the seatbelt buckle, i.e., in the buckled position, the clip may divide the webbing 28 into a lap band and a shoulder band. In the unbuckled position, the clip may move relative to the seatbelt buckle. In other words, the webbing 28 may be retractable into the retractor. The clip may, for example, be disposed between the anchor and the D-ring 24 to pull the webbing 28 from the unbuckled position to the buckled position. The webbing 28 may be elongated along a longitudinal axis L from the D-ring 24 to the clip.

The seatbelt assembly 12 may be a three-point harness meaning that the webbing 28 is attached at three points around the occupant when fastened: the anchor, the retractor, and the seatbelt buckle. The restraint system may, alternatively, include another arrangement of attachment points.

The track 16 may be fixed to one pillar, e.g., adjacent to one seat 30. For example, the track 16 may be fixed to the B-pillar 42, as shown in FIGS. 1A and 1B. The track 16 may be fixed to the B-pillar 42 in any suitable manner, e.g., fasteners, adhesive, welding, etc. The track 16 may be elongated along the B-pillar 42. Specifically, the track 16 may be elongated along an axis A extending through the floor 38 and the roof 36 of the vehicle 10. The track 16 may be aligned with the slot 46 of the pillar trim 44, as shown in FIGS. 1A and 1B.

Figure 2:
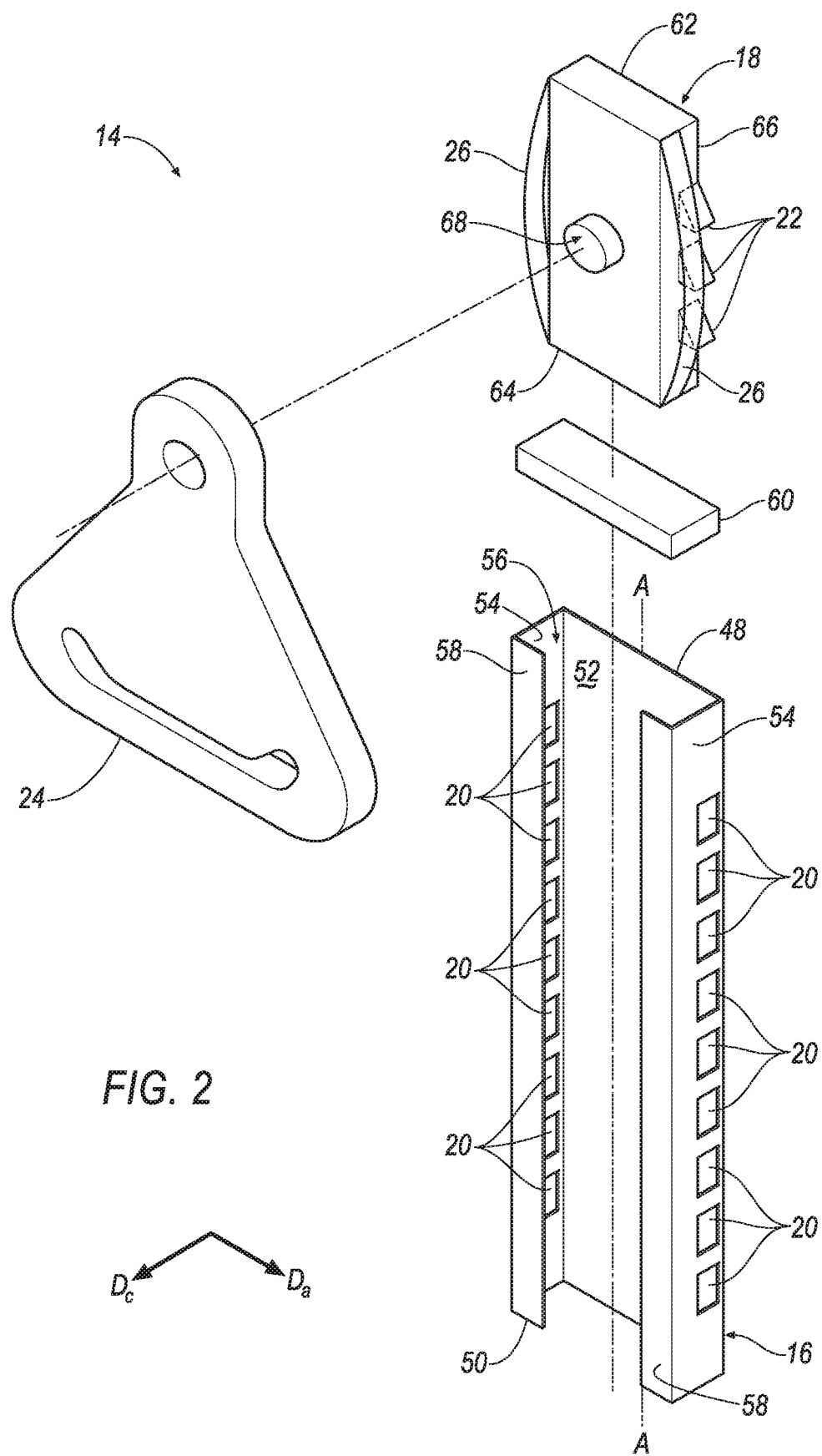
FIG. 2 is an exploded view of the seatbelt height adjuster.

With reference to FIGS. 2, 3A, and 4A, the track 16 may include a top 48 and a bottom 50 spaced from each other along the axis A. The track 16 may include a back 52 extending from the top 48 to the bottom 50. The track 16 may include walls 54 spaced from each other in the vehicle fore-and-aft direction Da. The walls 54 may be elongated along the track 16, e.g., from the top 48 to the bottom 50. The back 52 may extend from one wall 54 to the other wall 54 of the track 16.

With reference to FIGS. 2, 3B, and 4B, the walls 54 of the track 16 may define a channel 56 therebetween. For example, the channel 56 may extend from one wall 54 of the track 16 to the other wall 54 of the track 16. The channel 56 may be elongated along the track 16. In this situation, each wall 54 may include an extension 58 extending from the respective wall 54 toward the other wall 54. Each extension 58 may be spaced from the back 52. In other words, the channel 56 may extend from the back 52 to the extensions 58 in the cross-vehicle direction Dc. Said differently, the extensions 58 may partially define the channel 56. The extensions 58 may be spaced from each other in the vehicle fore-and-aft direction Da. In other words, the extensions 58 may extend partially across the back 52 of the track 16.

With reference to FIGS. 2, 3A, and 4A, a stopper 60 may be disposed in the channel 56, i.e., the stopper 60 may extend across the track 16, e.g., transverse to the axis A. The stopper 60 may be designed to slow or stop the movement of the slider 18 in the track 16. In other words, the stopper 60 is in the translational path of the slider 18. The stopper 60 may be fixed to the track 16. The stopper 60 may be fixed to the track 16 by any suitable manner, e.g., fasteners, welding, press-fit, etc. The stopper 60 may be any suitable material, e.g., metal, rubber, plastic, etc.

The seatbelt height adjuster 14 may include any suitable number of stoppers 60. For example, the seatbelt height adjuster 14 may include one stopper 60. In such an example, the stopper 60 may be disposed between the slider 18 and the bottom 50 of the track 16. In this situation, the stopper 60 may be spaced from the bottom 50 of the track 16 by any suitable amount. As another example, the seatbelt height adjuster 14 may include two stoppers 60. In such an example, one stopper 60 may be disposed between the slider 18 and the bottom 50 of the track 16, and the other stopper 60 may be disposed between the slider 18 and the top 48 of the track 16. In this situation, the stoppers 60 may be spaced from the top 48 and bottom 50 of the track 16, respectively, by any suitable amount.

With reference to FIGS. 2-4B, the slider 18 is disposed in the channel 56 of the track 16. The slider 18 may have a top 62 and a bottom 64 spaced from the top 62 along the axis A. The top 62 and bottom 64 may be spaced from each other by any suitable amount. In other words, the slider 18 may be any suitable size, e.g., perimeter, area, etc. The sides 66 of the slider 18 are spaced from each other transverse to the axis A and extend from the top 62 to the bottom 64. Each side 66 of the slider 18 may face one respective wall 54 of the track 16. Each side 66 of the slider 18 may be spaced from the one respective wall 54 of the track 16. For example, the leaf springs 26 may be disposed between the respective side 66 of the slider 18 and the respective wall 54 of the track 16. The slider 18 may have any suitable shape, e.g., rectangle, square, etc. The slider 18 may be any suitable material, e.g., metal, plastic, etc.

The slider 18 may include an opening 68 disposed between the top 62 and the bottom 64 of the slider 18, as shown in FIGS. 2-4B. The opening 68 may extend through the slider 18, e.g., in the cross-vehicle direction Dc. The opening 68 may have any suitable shape, e.g., square, rectangle, circle, etc. The opening 68 may have any suitable size, e.g., diameter, perimeter, etc.

The slider 18 is engageable between the locked state, as shown in FIGS. 4A and 4B, and the unlocked state, as shown in FIGS. 3A and 3B. In the locked state, the teeth 22 are engaged with the slots 20. For example, the teeth 22 may extend into the slots 20. In this situation, the slider 18 is fixed relative to the track 16. In other words, the teeth 22 may engage the slots 20 such that the teeth 22 and the slots 20 prevent relative movement between the slider 18 and the track 16.

In the unlocked state, the teeth 22 are disengaged, i.e., spaced, from the slots 20. In this situation, the slider 18 may be slidable relative to the track 16 along the axis A. For example, the slider 18 may be slidable along the axis A from the first position to the second position when the slider 18 is in the unlocked state. Specifically, in the unlocked state, friction between the leaf springs 26 and the track 16 retains the slider 18 in a selected position, and when force sufficient to overcome the friction is applied to the slider 18, e.g., by the webbing 28, the slider 18 moves relative to the track 16. In the first position, the bottom 64 of the slider 18 may abut the stopper 60. The slider 18 may be slidable relative to the track 16 to a plurality of second positions. In other words, the slider 18 may be disposed at any suitable second position. As one example, in the second position, the slider 18 may be spaced from the stopper 60. As another example, in the second position, the slider 18 may abut the stopper 60. In this situation, the second position is the same position as the first position. Additionally, when the slider 18 is in the second position, the slider 18 may be slidable transverse to the axis A by the webbing 28 to engage the teeth 22 with the slots 20, i.e., to the locked state.

The second position may be determined by the size, i.e., height of the occupant. For example, a distance between the stopper 60 and the slider 18 may be larger when the size of the occupant is equivalent to the $95^{th}$ percentile male statue sitting in the seat 30 than when the size of the occupant is equivalent to the $5^{th}$ percentile female statue sitting in the seat 30. In other words, the slider 18 may be spaced farther from the stopper 60 along the track 16 when the occupant is taller as compared to when the occupant is shorter. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 110 pounds, e.g., the Hybrid III $5^{th}$ percentile female. As another example, NHTSA has defined the $95^{th}$ percentile male stature to be 6 feet 2 inches tall and 223 pounds, e.g., the Hybrid III $95^{th}$ percentile male.

The D-ring 24 supports the webbing 28 and redirects tension applied thereto. The D-ring 24 may include a slot (not numbered). The webbing 28 may be slidably disposed within the slot of the D-ring 24. In other words, the webbing 28 may freely slide through the D-ring 24. For example, the clip may be disposed between the anchor and the D-ring 24 to pull the webbing 28 from the unbuckled position to the buckled position. The D-ring 24 may be metal, plastic, or any suitable material.

As set forth above, the D-ring 24 is supported by the slider 18. For example, the D-ring 24 may be pivotally engaged with the opening 68 of the slider 18. The D-ring 24 may be pivotable from a first position, as shown in FIG. 3A, to a second position, as shown in FIG. 4A. In the first position, the longitudinal axis L of the webbing 28 may extend substantially along the axis A of the track 16. In this situation, the slot of the D-ring 24 may be elongated substantially parallel to the floor 38. The D-ring 24 may be in the first position when the webbing 28 is in the retracted position. In the second position, the longitudinal axis L of the webbing 28 may extend oblique to the axis A of the track 16. In this situation, the slot of the D-ring 24 may be elongated oblique to the floor 38. The D-ring 24 may be in the second position when the webbing 28 is in the extended position. In other words, as the webbing 28 is extended from the retracted position, the webbing 28 may pull the D-ring 24 from the first position to the second position. Said differently, the D-ring 24 is pivotable from the first position to the second position by the webbing 28.

As set forth above, the slots 20 are on one of the track 16 and the slider 18. For example, the slots 20 may be disposed on at least one wall 54 of the track 16, as shown in the Figures. In this situation, the slots 20 extend from the channel 56 away from the axis A, i.e., in the vehicle fore-and-aft direction Da. The slots 20 may extend any suitable amount in the vehicle fore-and-aft direction Da. For example, the slots 20 may extend entirely through the wall 54, as shown in the Figures. As another example, the slots 20 may extend partially through the wall 54. The slots 20 may be disposed on the respective wall 54 between the top 48 and the bottom 50 of the track 16. As another example, the slots 20 may be disposed on the slider 18. In such an example, the slots 20 may extend into the slider 18 any suitable amount. In other words, the slots 20 may extend from the sides 66 of the slider 18 towards the axis A.

The slots 20 may be disposed at any suitable position between the back 52 of the track 16 and the extensions 58, i.e., in the cross-vehicle direction Dc. For example, the slots 20 may be disposed closer to the back 52 of the track 16 than the extensions 58 of the walls 54. In other words, a distance, e.g., in the cross-vehicle direction Dc, from the back 52 of the track 16 to the slots 20 may be less than a distance, e.g., in the cross-vehicle direction Dc, from the extensions 58 to the slots 20. Alternatively, the slots 20 may be disposed closer to the extensions 58 than the back 52 of the track 16.

The slots 20 may be spaced from each other along the axis A. The slots 20 may be spaced from each other by any suitable amount. The slots 20 may, for example, be elongated along the axis A. The slots 20 are designed, i.e., sized and positioned, to receive the respective teeth 22. The slots 20 may have any suitable shape, e.g., square, rectangle, circle, etc. The slots 20 may have any suitable size, e.g., perimeter, area, etc. The seatbelt height adjuster 14 may include any suitable number of slots 20.

As set forth above, the teeth 22 are disposed on the other of the track 16 and the slider 18. For example, the teeth 22 may be disposed on the slider 18, as shown in the Figures.

In such an example, the teeth 22 may be disposed on at least one side 66 of the slider 18. Specifically, the teeth 22 may be disposed on each side 66 of the slider 18 that faces the slots 20 on the track 16. Alternatively, the teeth 22 may be disposed on the track 16. In such an example, the teeth 22 may be disposed on at least one wall 54 of the track 16. Specifically, the teeth 22 may be disposed on each wall 54 of the track 16 that faces the slots 20 on the slider 18. The teeth 22 are disposed between the back 52 of the track 16 and the extensions 58 of the wall 54. Specifically, the teeth 22 are aligned with the slots 20 in the cross-vehicle direction Dc. In other words, the teeth 22 are spaced from the back 52 of the track 16 by a same amount as the slots 20 in the cross-vehicle direction Dc.

The teeth 22 may be elongated transverse to the axis A, e.g., in the vehicle fore-and-aft direction Da. For example, the teeth 22 may be elongated towards the slots 20. In other words, the teeth 22 may be elongated transverse to the leaf springs 26. The teeth 22 may be extendable through respective slots 20. For example, the teeth 22 may be spaced from the slots 20 in the vehicle fore-and-aft direction Da when the slider 18 is in the unlocked state, and the teeth 22 may extend through respective slots 20 when the slider 18 is in the locked state. In other words, the teeth 22 may be designed to extend through respective slots 20 when the slider 18 is in the locked state.

The teeth 22 may be spaced from each other along the axis A. The teeth 22 may be spaced from each other by any suitable amount. The seatbelt height adjuster 14 may include any suitable number of teeth 22. The teeth 22 may have any suitable shape, e.g., triangle, square, rectangle, etc. The teeth 22 may be any suitable material, e.g., metal, plastic, etc.

One leaf spring 26 may be disposed on one respective side 66 of the slider 18, as shown in the Figures. For example, each leaf spring 26 may be disposed between the respective side 66 of the slider 18 and the respective wall 54 of the track 16, as set forth above. In such an example, each leaf spring 26 may extend from the slider 18 to one respective wall 54 of the track 16. In this situation, each leaf spring 26 biases the slider 18 away from the respective wall 54, i.e., pushes the slider 18 towards the axis A. For example, each leaf spring 26 may bias the slider 18 toward a position centered on the axis A. In other words, when the slider 18 is in the unlocked state, the slider 18 may be centered on the axis A, i.e., spaced equidistant from each wall 54 of the track 16, as shown in FIG. 3A. When the slider 18 moves transverse to the axis A, the slider 18 compresses one of the leaf springs 26. In other words, one side 66 of the slider 18 is disposed closer to the respective wall 54 of the track 16 when the slider 18 is in the locked state as compared to the unlocked state. Said differently, the slider 18 is offset from the axis A when the slider 18 is in the locked state, as shown in FIG. 4A.

With reference to FIGS. 2, 3A, and 4A, each leaf spring 26 may be elongated along the axis A. For example, each leaf spring 26 may be elongated from the top 62 of the slider 18 to the bottom 64 of the slider 18. Alternatively, each leaf spring 26 may be elongated transverse to the axis A, e.g., from the back 52 of the track 16 to the respective extension 58.

One of the leaf springs 26 and the teeth 22 may be disposed between the D-ring 24 and the other of the leaf springs 26 and the teeth 22. In other words, the leaf springs 26 and the teeth 22 may be spaced from each other in the cross-vehicle direction Dc. For example, the leaf springs 26 may be disposed between the teeth 22 and the D-ring 24, as shown in FIGS. 2, 3B, and 4B. Alternatively, the teeth 22 may be disposed between the leaf springs 26 and the D-ring 24. The leaf springs 26 are fixed to the slider 18, e.g., by fasteners, welding, adhesive, etc. The leaf springs 26 may be any suitable material, e.g., metal, plastic, etc.

The leaf springs 26 are frictionally engaged with the track 16. The leaf springs 26 may be designed to slide along the track 16 when a force (not shown) above a predetermined force is applied to the webbing 28. In this situation, the force may be at least a component of a force acting on the webbing 28 along the axis A. During extension of the webbing 28 to the extended position, the force applied to the webbing 28 may, for example, be above the predetermined force such that the webbing 28 moves the slider 18 from the first position to the second position. Additionally, when the clip is in the buckled position, the webbing 28 may contact the shoulder of the occupant. In this situation, the force applied to the webbing 28, e.g., from the shoulder of the occupant, may be the predetermined force such that the leaf springs 26 maintain the slider 18 in the second position. The predetermined force is determined by a difference between a friction force of the leaf springs 26 and a gravitational force.

Additionally, the leaf springs 26 may be designed to compress when a force above a predetermined force is applied to the webbing 28. In this situation, the force may be at least a component of a force F acting on the webbing 28 transverse to the axis A. For example, during a vehicle impact, the occupant may be urged into the webbing 28. In this situation, the force applied to the webbing 28, e.g., in the vehicle fore-and-aft direction Da, may be above the predetermined force such that the slider 18 moves transverse to the axis A to the locked state. The predetermined force is determined by a bias force of the leaf springs 26. In other words, the slider 18 engages in the locked state when the force applied to the webbing 28 overcomes the biasing of the respective leaf spring 26. After the vehicle impact, the leaf spring 26 may bias the slider 18 back towards the positioned centered on the axis A, i.e., to the unlocked state.

Under normal operating conditions, the teeth 22 are disengaged with the slots 20. In other words, the slider 18 is in the unlocked state. In this situation, the slider 18 is slidable relative to the track 16 along the axis A. An occupant may manually pull the webbing 28 from the retracted position to the extended position. In this situation, the slider 18 may move upwardly along the track 16 from the first position such that the webbing 28 may extend over the shoulder of the occupant. When the webbing 28 is in the buckled position, the leaf springs 26 may maintain the slider 18 in the second position. Additionally, in the event of a vehicle impact, the occupant may be urged into the webbing 28. In this situation, the webbing 28 pulls the slider 18 to the locked state to control kinematics of the occupant. By sliding to the locked state, the teeth 22 engage the slots 20, which prevents the slider 18 from moving relative to the track 16. In this situation, the seatbelt height adjuster 14 fixes the position of the webbing 28 relative to the occupant to distribute load from the occupant through the body 32 of the vehicle 10, e.g., the B-pillar 42.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first," "second," "third," "fourth," "fifth," and "sixth" are used throughout this document as identifiers and are not intended to signify importance or order. Many modifications and variations of the present disclosure are possible in light of the above teachings, and the disclosure may be practiced otherwise than as specifically described.

What is claimed is:

1. A seatbelt height adjuster comprising:
a track;
a slider slidably coupled to the track;
slots in one of the track and the slider and teeth on the other of the track and the slider, the teeth selectively engageable with the slots;
a D-ring supported by the slider; and
leaf springs disposed on opposite sides of the slider, the leaf springs each engaged with the track and biasing the slider in opposite directions;
wherein one of the leaf springs and the teeth are disposed between the D-ring and the other of the leaf springs and the teeth.

2. The seatbelt height adjuster of claim 1, wherein the track is elongated along an axis and the slider is slidable along the axis when the teeth are disengaged with the slots.

3. The seatbelt height adjuster of claim 2, wherein the slider is slidable transverse to the axis to engage the teeth with the slots.

4. The seatbelt height adjuster of claim 3, wherein the slider compresses one of the leaf springs when the slider slides transverse to the axis.

5. The seatbelt height adjuster of claim 2, wherein the teeth are spaced from each other along the axis.

6. The seatbelt height adjuster of claim 2, wherein the slots are spaced from each other along the axis.

7. The seatbelt height adjuster of claim 2, wherein the leaf springs are elongated along the axis.

8. The seatbelt height adjuster of claim 1, wherein the track is elongated along an axis and the leaf springs bias the slider toward a position centered on the axis.

9. The seatbelt height adjuster of claim 8, wherein the slider is slidable transverse to the axis to engage the teeth with the slots.

10. The seatbelt height adjuster of claim 9, wherein the slider compresses one of the leaf springs when the slider slides transverse to the axis.

11. The seatbelt height adjuster of claim 8, wherein the teeth are spaced from each other along the axis.

12. The seatbelt height adjuster of claim 8, wherein the slots are spaced from each other along the axis.

13. The seatbelt height adjuster of claim 8, wherein the leaf springs are elongated along the axis.

14. The seatbelt height adjuster of claim 1, wherein the teeth are extendable through respective slots.

15. The seatbelt height adjuster of claim 1, wherein the teeth are elongated transverse to the leaf springs.

16. The seatbelt height adjuster of claim 1, further comprising a stopper fixed to the track, the slider engageable with the stopper.

17. The seatbelt height adjuster of claim 1, wherein the D-ring is pivotable relative to the slider.

18. The seatbelt height adjuster of claim 1, further comprising a webbing extending through the D-ring, the leaf springs being designed to slide along the track when a force above a predetermined force is applied to the webbing when the teeth are disengaged with the slots.

19. A vehicle comprising;
a pillar;
a track elongated along the pillar;
a slider slidably coupled to the track;

slots in one of the track and the slider and teeth on the other of the track and the slider, the teeth selectively engageable with the slots;

a D-ring supported by the slider; and leaf springs disposed on opposite sides of the slider, the leaf springs each engaged with the track and biasing the slider in opposite directions;

wherein one of the leaf springs and the teeth are disposed between the D-ring and the other of the leaf springs and the teeth.

20. A seatbelt height adjuster comprising:

a track;

a slider slidably coupled to the track;

slots in one of the track and the slider and teeth on the other of the track and the slider, the teeth selectively engageable with the slots;

a D-ring supported by the slider; and leaf springs disposed on opposite sides of the slider, the leaf springs each engaged with the track and biasing the slider in opposite directions;

wherein the track is elongated along an axis and the leaf springs bias the slider toward a position centered on the axis;

wherein the slider is slidable transverse to the axis to engage the teeth with the slots;

wherein the slider compresses one of the leaf springs when the slider slides transverse to the axis.

* * * * *